(12) United States Patent
Apfel

(10) Patent No.: US 8,249,247 B2
(45) Date of Patent: Aug. 21, 2012

(54) TRACKING VOLTAGE REGULATOR FOR A SUBSCRIBER LINE INTERFACE CIRCUIT

(75) Inventor: Russell J. Apfel, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1614 days.

(21) Appl. No.: 11/645,878

(22) Filed: Dec. 27, 2006

(65) Prior Publication Data

US 2008/0159525 A1 Jul. 3, 2008

(51) Int. Cl.
*H04M 1/00* (2006.01)

(52) U.S. Cl. ........ 379/413; 379/377; 379/398; 379/404; 379/405

(58) Field of Classification Search .......... 379/399.01–413.04, 377, 398
See application file for complete search history.

(56) References Cited

U.S. PATENT DOCUMENTS

| | | | |
|---|---|---|---|
| 4,197,435 A | 4/1980 | Jackson et al. | |
| 4,323,734 A | 4/1982 | Kimzey | |
| 4,600,811 A | 7/1986 | Hayashi et al. | |
| 5,596,637 A | 1/1997 | Pasetti et al. | |
| 5,619,467 A * | 4/1997 | Sim | 365/208 |
| 5,619,567 A | 4/1997 | Apfel | 379/413 |
| 5,737,411 A | 4/1998 | Apfel | 379/413 |
| 5,854,839 A | 12/1998 | Chen et al. | |
| 5,881,129 A | 3/1999 | Chen et al. | |
| 6,320,467 B1 | 11/2001 | Hallen | |
| 6,351,528 B1 * | 2/2002 | Apfel | 379/377 |
| 6,356,624 B1 | 3/2002 | Apfel | 379/27.01 |
| 6,476,753 B1 | 11/2002 | Hansen et al. | |
| 6,566,957 B1 | 5/2003 | Caine | |
| 6,590,448 B1 | 7/2003 | Burt | |
| 6,735,302 B1 * | 5/2004 | Caine et al. | 379/405 |
| 6,778,663 B1 | 8/2004 | Schopfer | |
| 6,934,384 B1 | 8/2005 | Hein et al. | 379/399.02 |
| 6,956,945 B2 | 10/2005 | Apfel | 379/413 |
| 7,113,590 B2 | 9/2006 | Apfel | 379/399.01 |
| 7,116,778 B2 | 10/2006 | Eckhoff et al. | 379/399.01 |
| 2003/0072436 A1 | 4/2003 | Eckhoff et al. | 379/399.01 |
| 2004/0258183 A1 | 12/2004 | Popescu et al. | |
| 2005/0024143 A1 * | 2/2005 | Humphrey | 330/255 |
| 2006/0115076 A1 | 6/2006 | Enriquez et al. | |

OTHER PUBLICATIONS

U.S. Patent and Trademark Office, Office Action dated May 26, 2010, in U.S. Appl. No. 11/453,417.

(Continued)

*Primary Examiner* — Fan Tsang
*Assistant Examiner* — Ibraham Sharifzada
(74) *Attorney, Agent, or Firm* — Trop, Pruner & Hu, P.C.

(57) ABSTRACT

In one embodiment, the present invention includes an apparatus having a first pair of low voltage operational amplifiers to generate an output representative of an absolute value difference of first and second line voltages of a subscriber loop, and a third low voltage operational amplifier having an input coupled to the output of the first pair of low voltage operational amplifiers to filter the output and to provide a switch control signal for a switching regulator that provides a voltage used to generate the first and second line voltages. The apparatus may include additional circuits such as a limit circuit to limit the input to the third low voltage operational amplifier and one or more speedup circuits to reduce a filter time constant of the third low voltage operational amplifier during a ringing mode of the subscriber loop.

15 Claims, 9 Drawing Sheets

OTHER PUBLICATIONS

U.S. Patent and Trademark Office, Office Action dated Jun. 9, 2010, in U.S. Appl. No. 11/453,418.

U.S. Appl. No. 11/453,418, filed Jun. 15, 2006, entitled, "An Output Stacking Architecture for an Amplifier," by Russell J. Apfel and Richard B. Webb.

U.S. Appl. No. 11/453,702, filed Jun. 15, 2006, entitled, "Current Mirror Architectures," by Russell J. Apfel.

U.S. Appl. No. 11/453,417, filed Jun. 15, 2006, entitled, "Methods and Apparatus for Performing Subscriber Line Interface Functions," by Russell J. Apfel.

U.S. Appl. No. 11/646,057, filed Dec. 27, 2006, entitled, "Methods and Apparatus for Low Voltage Control of a Subscriber Line Interface Circuit," by Russell J. Apfel.

Silicon Laboratories, "Si3220/25 Dual ProSLIC," Oct. 2001, pp. 1-2.

Silicon Laboratories, "Si324x/Si3205 Quad ProSLIC Programmable CMOS SLIC/Codec," Sep. 22, 2005, pp. 1-2.

U.S. Patent and Trademark Office, Office Action dated Nov. 12, 2009 with Reply filed on Nov. 12, 2010 in U.S. Appl. No. 11/453,417.

U.S. Patent and Trademark Office, Office Action mailed Sep. 28, 2010 with Reply filed Dec. 23, 2010 in U.S. Appl. No. 11/646,057.

U.S. Patent and Trademark Office, Final Office Action mailed Feb. 24, 2011 with Reply to Final filed Apr. 6, 2011 in U.S. Appl. No. 11/646,057.

\* cited by examiner

310

320

TRACKING VOLTAGE REGULATOR FOR A SUBSCRIBER LINE INTERFACE CIRCUIT

FIELD OF THE INVENTION

Embodiments of the present invention relate to telecommunications, and more particularly to subscriber line interface circuitry for telecommunication systems.

BACKGROUND

Subscriber line interface circuits (SLICs) are often present in a central office exchange of a telecommunications network or remote locations thereto for use in providing a communication interface between a digital switching network of a central office and an analog subscriber line. The analog subscriber line connects to a subscriber station or telephone instrument at a location that is remote from the central office exchange.

The analog subscriber line and subscriber equipment (e.g., a telephone) form a subscriber loop. The interface requirements of a SLIC typically require high voltages and currents for control signaling with respect to the subscriber equipment on the subscriber loop. Voiceband communications are typically low voltage analog signals on the subscriber loop. Accordingly, the SLIC performs various functions with respect to voiceband and control signaling between the subscriber equipment and the central exchange.

SLIC functionality has generally been implemented in multiple integrated circuits (ICs), or combinations of ICs and discrete elements. Typically, significant high voltage circuitry is included in one IC to provide various high voltage functionality of a SLIC. Accompanying low voltage IC's are used to perform control functions for the high voltage portion and also to perform low voltage tasks, voice signal processing, and to provide an interface to system circuitry, e.g., a system on a chip (SOC) such as a digital signal processor (DSP) or other digital processing circuit of a central office or similar location. In turn, the DSP is coupled to provide system input/output (I/O) signals to other locations in the telecommunications network. In other implementations, instead of a DSP interface, the SLIC may couple directly into a switching system.

Typically, a significant number of wires or signal lines are used to connect low voltage portions of a SLIC with the high voltage portion. Furthermore, different SOCs or DSPs used in a system can require different information from a SLIC. That is, different DSPs have different capabilities with respect to signal processing. Some DSPs include capabilities for analog signal processing such as codec functionality and filtering, while other DSPs strictly handle digital signal processing for system requirements such as code compression, call processing, echo cancellation, among others. Accordingly, different SLIC configurations are needed to interface with different DSPs.

These different SLIC configurations typically require completely different designs, often in different process technologies. Such different designs are not readily reused across different process technologies and different SLIC configurations. Another limitation with respect to SLIC design is that because of the criticalities of the different low voltage and high voltage components, it is typically difficult to port a given design across different process technologies. Thus, a SLIC design implemented in one process technology is not easily ported to another technology, owing to differences in device characteristics. This typically requires the need for significant calibration, trimming and other design-intensive matching of devices.

To power the SLIC as well as equipment on the subscriber loop, SLICs typically implement one or more tracking voltage regulators. These regulators operate by measuring the voltage across the loop and adding overhead voltage. In this way, a regulator may track the line voltage, and provide sufficient extra voltage for the electronic circuits of the SLIC to operate properly. Typically, such regulators are implemented using high voltage circuitry, which consumes excessive space, power and increases heat dissipation.

Switching regulators can suffer from slow transient response to changes in line conditions. For example, such transient response may occur when subscriber equipment connected to the SLIC is placed off hook, in ringing, and so forth. For example, going from off hook to on hook may cause an overload of a DC feed loop, causing dial pulse distortion or other undesired effects. Furthermore, when multiple pieces of subscriber equipment are coupled to a line, transient response can be negatively affected. Typical regulators incur time delays in responding to such transients, leading to deleterious effects on performance.

SUMMARY OF THE INVENTION

In one aspect, the present invention includes an apparatus having a first pair of low voltage operational amplifiers to generate an output representative of an absolute value difference of first and second line voltages of a subscriber loop, and a third low voltage operational amplifier having an input coupled to the output of the first pair of low voltage operational amplifiers to filter the output and to provide a switch control signal for a switching regulator that provides a voltage used to generate the first and second line voltages. The apparatus may include additional circuits such as a limit circuit to limit the input to the third low voltage operational amplifier and one or more speedup circuits coupled to the input of the third low voltage operational amplifier to reduce its filter time constant during a ringing mode of the subscriber loop.

In another aspect, the present invention is directed to an apparatus having a first resistance coupled between a first lead of a subscriber loop and a first node and a first capacitance coupled between the first node and a second node, a first operational amplifier having a first input terminal coupled to the first node and a second input terminal coupled to receive a reference voltage, a pair of metal oxide semiconductor field effect transistors (MOSFETs) having gate terminals coupled to an output of the first operational amplifier, and a current mirror having an input node coupled to a second terminal of the first MOSFET and an output node coupled to a second terminal of the second MOSFET. The second terminal of the second MOSFET may provide a control signal to a switching regulator for a subscriber line interface circuit (SLIC) coupled to the subscriber loop.

Yet another aspect of the present invention is directed to a system that includes a low voltage SLIC and a high voltage SLIC. The low voltage SLIC may provide for control of a switching regulator of the high voltage SLIC and may include a first operational amplifier having a first input terminal coupled to an intermediate node between tip and ring voltages and a second input terminal coupled to receive a reference voltage, a pair of MOSFETs having gate terminals coupled to an output of the first operational amplifier, and a current mirror having an input node coupled to a second terminal of the first MOSFET and an output node coupled to a second terminal of the second MOSFET, where the second terminal of the second MOSFET is to provide a filtered control current. The high voltage SLIC may be coupled to the low voltage SLIC via a three-wire interface.

DETAILED DESCRIPTION

Figure 1A:
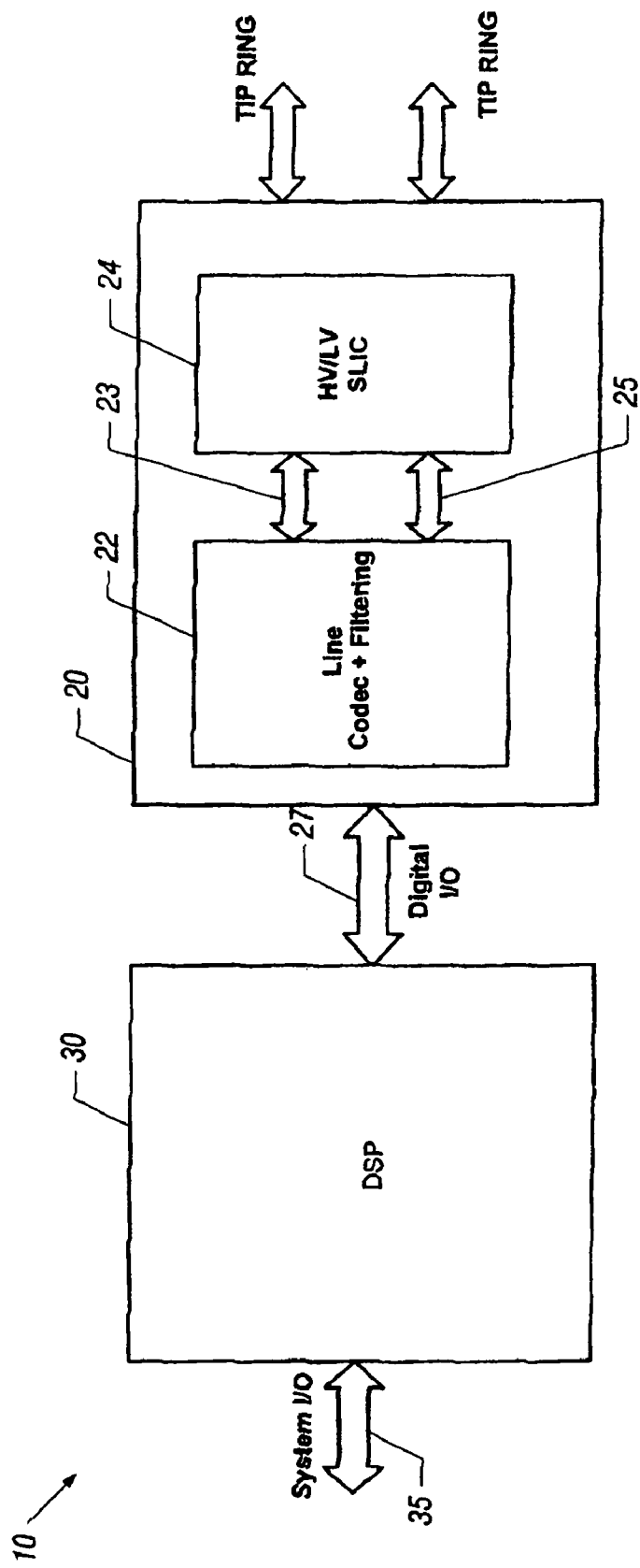
FIG. 1A is a block diagram of a system implementation in accordance with one embodiment of the present invention.

Referring now to FIG. 1A, shown is a block diagram of a system implementation in accordance with one embodiment of the present invention. As shown in FIG. 1A, system 10 may include a line card 20 that includes, for example, separate ICs including a line codec 22 and a SLIC 24 which may include both high voltage and low voltage SLIC functionality. Codec 22 may further perform filtering functions. These ICs may be coupled via a first interface 23 and a second interface 25, in which first interface 23 includes control signals while second interface 25 includes data signals. Line card 20 may be coupled to a subscriber line, e.g., via tip and ring lines. In the embodiment shown in FIG. 1A, multiple channels may be present in line card 20 such that line card 20 may interface with a first subscriber line via a first interface and a second subscriber line via a second interface.

In turn, line card 20 may be coupled via a digital I/O 27 to a DSP 30. DSP 30 may be a conventional DSP that performs only digital signal processing. Accordingly, all coding and decoding functions may be performed in line codec 22 and thus only digital signaling occurs over digital I/O 27. DSP 30 may be coupled to other system components via a system I/O 35. While described with this particular implementation with regard to FIG. 1A, it is to be understood that the scope of the present invention is not so limited, and in other embodiments different manners of segmenting SLIC functionality between different devices of a system can be implemented. For example, in different implementations instead of an interface to DSP 30, a line card may interface directly with switching circuitry of a central office, e.g., via a backplane or other such connection. Also, in other implementations, more SLIC functionality may be moved to the codec-based IC.

Figure 1B:
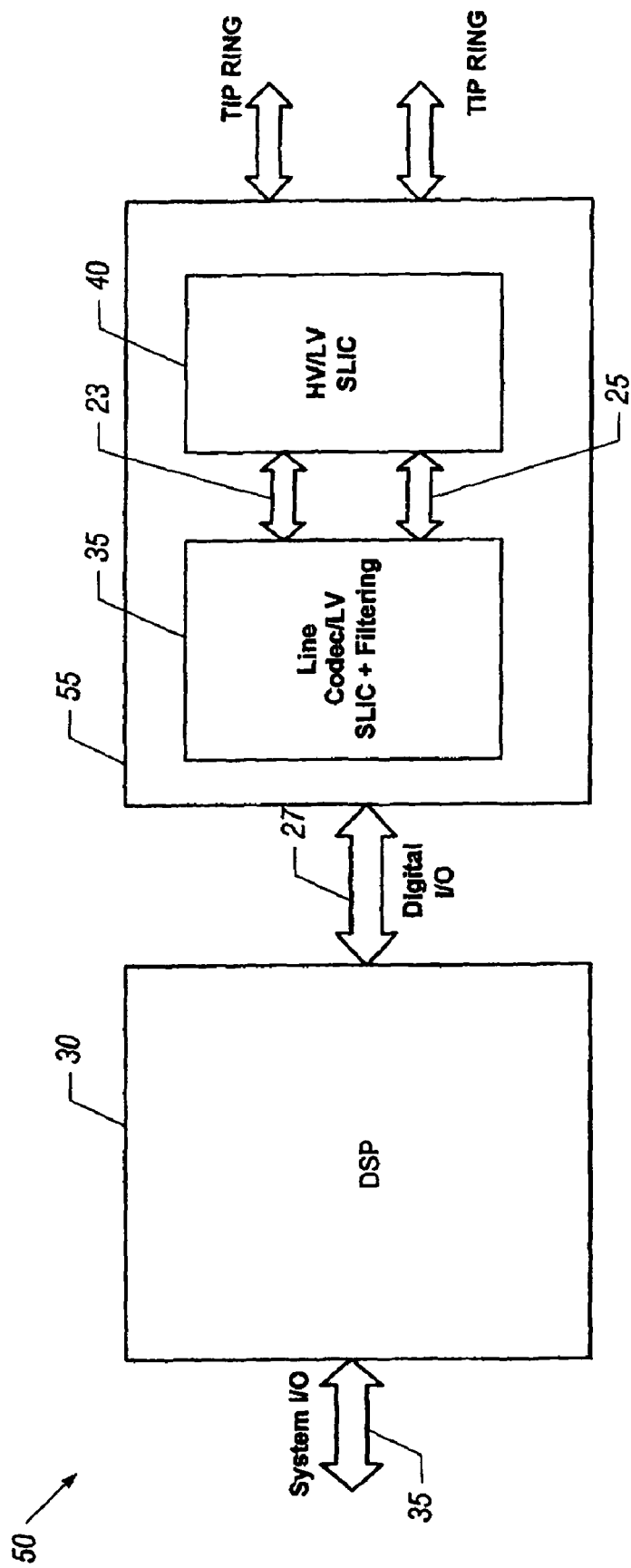
FIG. 1B is a block diagram of a system implementation in accordance with another embodiment of the present invention.

Thus referring now to FIG. 1B, shown is a block diagram of another system implementation in accordance with an embodiment of the present invention. As shown in FIG. 1B, system 50 may include a line card 55 that includes separate ICs, namely a codec/low voltage SLIC 35 and a high voltage/low voltage SLIC 40. In this system implementation, at least portions of the low voltage SLIC functionality is provided in IC 35, which further performs coding/decoding functions in addition to filtering. SLIC 40 includes the high voltage SLIC functionality, as well as at least a portion of low voltage SLIC functions. In this embodiment, reduced costs may be realized by moving at least some of these low voltages SLIC functions into IC 35, which is a low voltage IC. In other respects, system 50 may be adapted similarly as system 10 of FIG. 1A.

Figure 2:
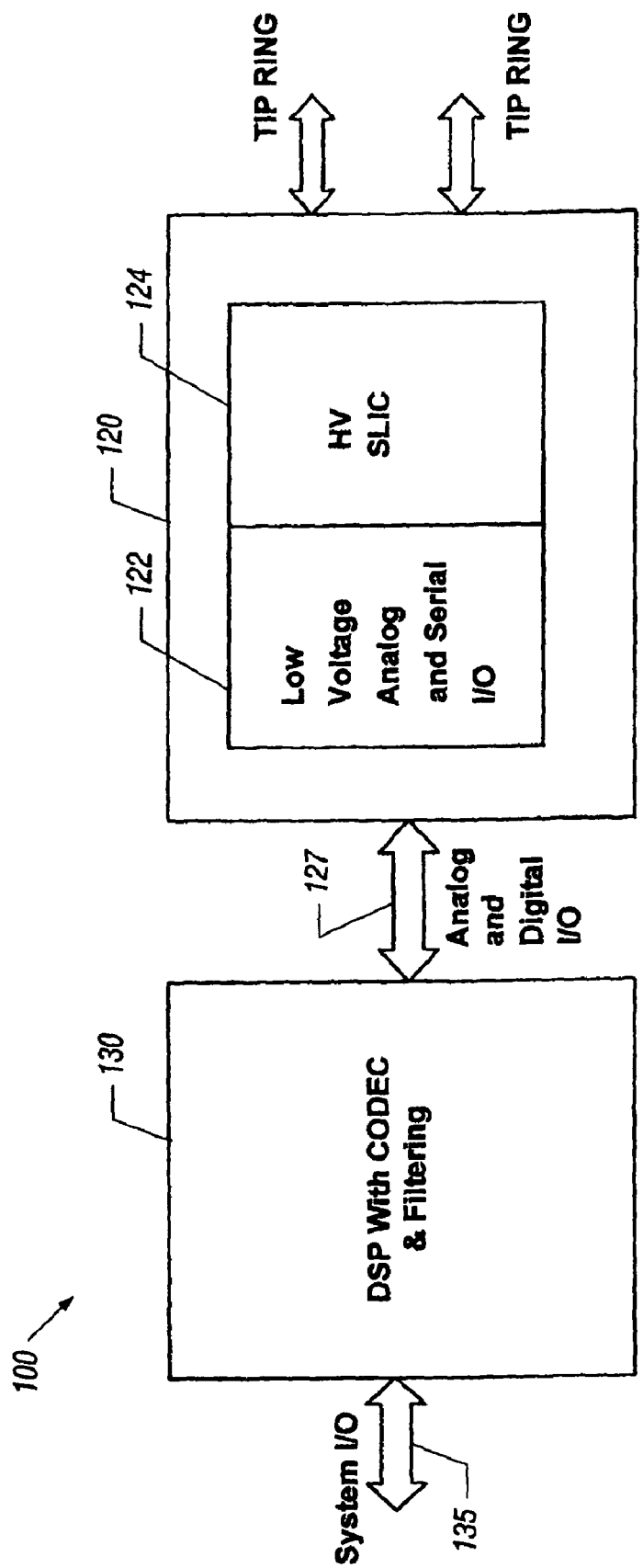
FIG. 2 is a block diagram of a system implementation in accordance with another embodiment of the present invention.

Referring now to FIG. 2, shown is a block diagram of a system implementation in accordance with another embodiment of the present invention. As shown in FIG. 2, system 100 includes a line card 120 that is coupled to a DSP 130. In this embodiment, DSP 130 includes codec functionality to receive analog signals and perform various coding operations on analog data (e.g., voiceband communications), as well as filtering. Thus in this embodiment, various functionality previously present in a line card can be performed in a DSP or other components to which a line card is coupled. For example in the embodiment shown in FIG. 2, codec and filter functionality may be incorporated into such a DSP or other component. Accordingly, a combined analog and digital I/O interface 127 couples line card 120 and DSP 130. Because of the different type of DSP used (as compared with FIG. 1), line card 120 may include different components than line card 20 of FIG. 1. Namely, line card 120 may include a high voltage SLIC 124 and a low voltage IC 122. Low voltage IC 122 may include control circuitry to implement low voltage analog and I/O interface functions. As further shown in FIG. 2, line card 120 is coupled to, e.g., two subscriber loops via first and second interfaces. In turn, DSP 130 is coupled to a remainder of a system via a system I/O interface 135. Accordingly, based on various system configurations and more particularly different DSPs with which a line card is coupled, different ICs or other circuitry to implement different functionality may be incorporated within a given line card.

Still further, in other embodiments a minimal amount of circuitry may be implemented within a line card or high voltage SLIC. To this end, various low voltage control and SLIC functionality that can be performed at a low voltage may be integrated within a system on a chip (SOC) or other such DSP. Accordingly, high voltage and other components of a line card may be reduced to a minimal portion, and coding functionality (among other such traditional SLIC functionality) may be implemented within a SOC.

Figure 3:
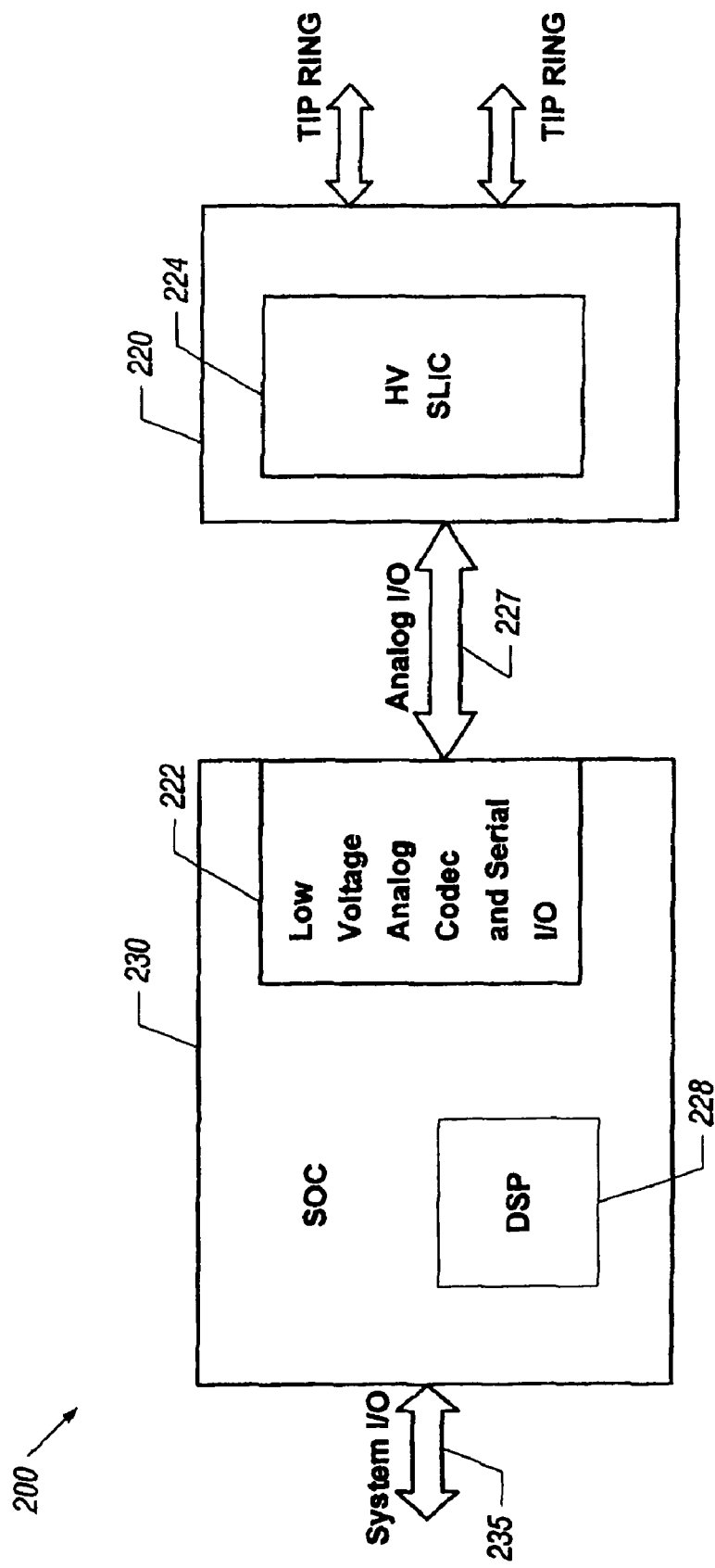
FIG. 3 is a block diagram of a system implementation in accordance with yet another embodiment.

Referring now to FIG. 3, shown is a block diagram of a portion of a system implementation in accordance with such an embodiment. As shown in FIG. 3, system 200 includes a line card 220 that includes a high voltage SLIC 224. Note that only a single IC is present within line card 220, thus reducing size and cost of the line card. Line card 220 acts as an interface to one or more subscriber loops, e.g., via tip and ring lines. In turn, line card 220 is coupled to a SOC 230 via an analog I/O 227. In various implementations, analog I/O interface 227 may include a minimal number of wires to handle a minimum amount of signaling needed between line card 220 and SOC 230. In one embodiment, a three-pin analog I/O interface may be implemented. These three analog pins, as will be discussed further below, may flow current of different values to represent different logic values to control operation of high voltage SLIC 224. In this way, the needed information to be passed between the high voltage and low voltage portions may be implemented using minimal connections. Further, because of the use of analog signals to represent different logic states, such an interface may be easily ported across process technologies.

Still referring to FIG. 3, SOC 230 includes a low voltage core 222 that handles interface functionality with high voltage SLIC 224, along with various low voltage SLIC functionality and codec functionality. In various implementations, core 222 may be implemented with a design, i.e., a process technology independent design that is easily ported across process technologies. For example, core 222 may be built using a number of operational amplifiers (op-amps) that are easily ported across process technologies without the need for precision matching or other trimming or calibration functions. By basing a design on an op-amp structure, requirements may be kept relatively simple, as precision of the design may be based on matching resistors. Since virtually all IC technologies include a device or structure that can provide matched resistors, such matching may be nominally achieved. That is, in many technologies, resistor matching of approximately 0.1% may be achieved with minimal effort. Because implementations may implement resistor matching in the range of approximately 0.5%, such matching requirements can be handily met. As will be described further below, various designs may further include analog switches and diodes that may be present in most technologies. Accordingly, embodiments may provide low voltage control for SLIC circuitry in a cost effective manner, obtaining high precision with resistors as the only precision matched components of the design.

In various embodiments, core 222 may be a multi-channel core that can perform signal processing for multiple communication channels. Core 222 thus may be a generic core to handle low voltage SLIC functionality. As such, core 222 may be implemented in a design of a variety of DSPs or SOCs that are implemented in many different process technologies. For example, different SOCs may be implemented using different CMOS process technologies of different technology nodes. Or other process implementations such as bipolar, BiCMOS, DMDMOS, or other process technology may be used. In addition to core 222, SOC 230 further includes conventional DSP circuitry 228 to perform various signal processing functions. Accordingly, SOC 230 communicates with a remaining portion of a system via a system I/O interface 235.

Note that because the circuitry to implement core 222 may be based on an easily portable design, it may be possible to provide core 222 as an independent design capable of being implemented within different DSPs or SOCs of many different manufacturers. Accordingly, core 222, which may be designed by one entity, may be an independently licensable circuit design that can be readily accommodated to different process technologies of underlying SOC's of many different entities.

Figure 4:
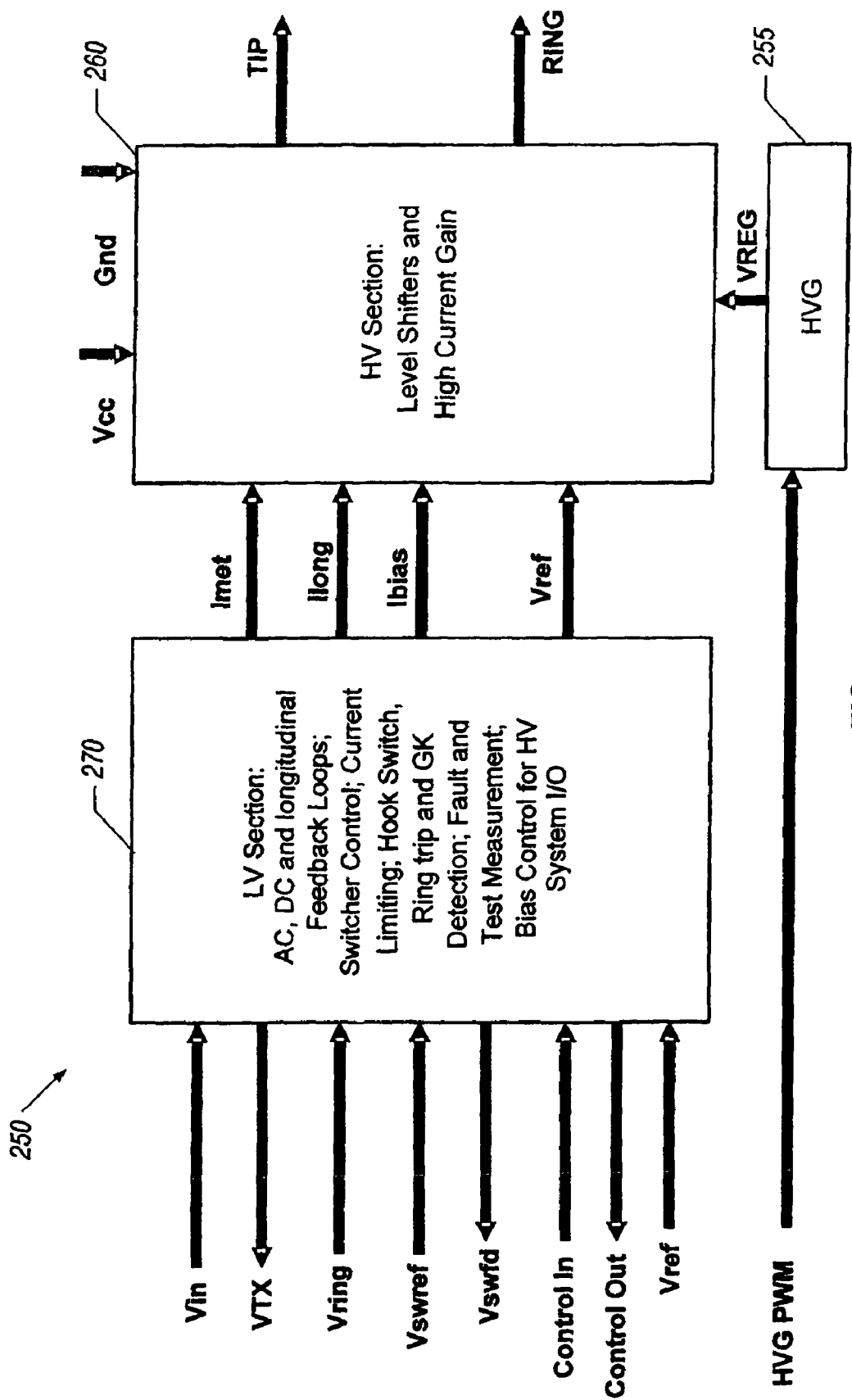
FIG. 4 is an example segmentation of functionality performed in high voltage and low voltage portions of a SLIC in accordance with an embodiment of the present invention.

In many implementations, a SLIC in accordance with an embodiment of the present invention may be designed such that as much control and functionality as possible is implemented in low voltage circuitry, thus reducing real estate and power consumption. Accordingly, only a minimal amount of circuitry is handled at high voltages. Referring now to FIG. 4, shown is an example segmentation of functionality performed in high voltage and low voltage portions of a SLIC 250 in accordance with an embodiment of the present invention. As shown in FIG. 4, SLIC 250 includes a low voltage portion 270 and a high voltage portion 260. Furthermore, a high voltage generator 255 is present and is coupled to provide a regulated voltage ($V_{REG}$) to high voltage portion 260. While shown as a separate component in the embodiment of FIG. 4, it is to be understood that high voltage generator 255 may be part of high voltage portion 260, or its functions may be split among low voltage portion 270 and high voltage portion 260. High voltage portion 260 is coupled to receive three analog signals, namely three analog currents from low voltage section 270. As shown in FIG. 4, these three signals include a metallic current ($I_{met}$), a longitudinal current ($I_{long}$) and a bias current ($I_{Bias}$), each of which will be discussed further below. Furthermore, a reference voltage may be provided from low voltage portion 270 to high voltage portion 260. High voltage portion 260 is further coupled to receive a supply voltage (i.e., $V_{cc}$) and a ground potential (i.e., GND).

Still referring to FIG. 4, low voltage portion 270 includes various circuitry to perform different functions, including AC/DC and longitudinal feedback control. Low voltage portion 270 may further include switching control, current limiting, hook switch, ring trip and ground key (GK) detection. Thus low voltage portion 270 includes feedback control loops to sense conditions at the SLIC outputs and provide control signals to high voltage portion 260. Furthermore, LV portion 270 includes fault and test measurement capabilities, along with bias control for high voltage portion 260, as well as an interface to a system I/O. To implement these functions, low voltage portion 270 may include various signal lines to interface with different portions of other system circuitry, e.g., a DSP. Accordingly, as shown in FIG. 4, different voltages and control signals may be provided to and from low voltage portion 270. While shown with this particular implementation in the embodiment of FIG. 4, it is to be understood that the scope of the present invention is not so limited. Low voltage portion 270 may be located in various physical locations in different embodiments. For example, in a system such as that shown in FIG. 2, low voltage portion 270 may be physically implemented as low voltage IC 122. In a system such as that shown in FIG. 3, low voltage portion 270 may be implemented within core 222 that is itself implemented within a SOC 230.

In turn, high voltage section 260 may interface with a subscriber loop, e.g., via tip and ring lines. High voltage section 260 may further include various circuitries to perform level shifting functions as well as to amplify the currents received from low voltage portion 270. For example, in one implementation one or more high current gain blocks may be implemented within high voltage portion 260. In one embodiment, the gain blocks may have a gain of approximately 200, although the scope of the present invention is not so limited.

In one embodiment, high voltage portion 260 may include first and second input stages: namely a metallic input stage that is coupled to receive a metallic input to generate currents that develop differential outputs in current gain amplifiers, in other words, currents that are equal in magnitude but different in direction of flow; and a longitudinal input stage that is coupled to receive a longitudinal input generate currents that are equal in magnitude but in the same direction in the current amplifiers. The longitudinal current loop thus forces output currents of the current amplifiers to be equal (minus any external, common mode currents) and prevents the current amplifiers from saturation. In turn, each of these input stages may be coupled to both of a pair of current amplifiers, each of which may include a pair of unidirectional current gain amplifiers implemented using a low voltage op-amp building block.

In various embodiments, a regulator/controller may track voltages on the subscriber loop in voice and ringing states. Additionally, the regulator/controller may implement controlled limits on both maximum and minimum voltages. Furthermore, to improve transient response, speedup circuits may be implemented to improve compliance with various system specifications such as dial pulse distortion. In various embodiments, a regulator/controller in accordance with an embodiment of the present invention may indirectly measure DC line current via a control current that is output by a DC feed controller. To further improve performance, in some implementations filtering may be provided to prevent AC signals from affecting overhead voltages. Some embodiments may perform control at low voltages and provide control signals to the regulator to enable generation of the needed voltages.

Figure 5:
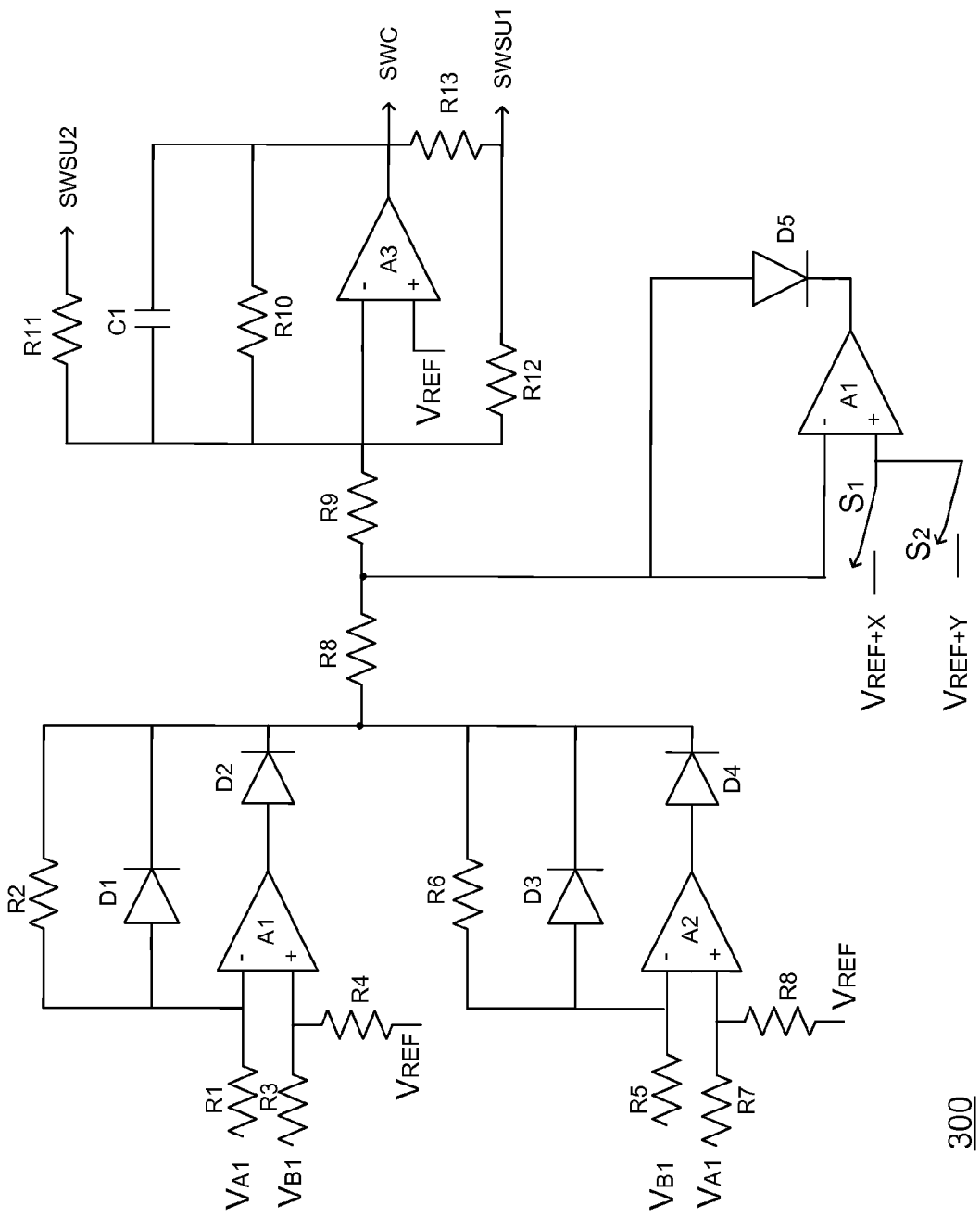
FIG. 5 is a block diagram of a low voltage control circuit for a switching regulator in accordance with one embodiment of the present invention.

Referring now to FIG. 5, shown is a schematic diagram of a portion of a tracking regulator controller in accordance with an embodiment of the present invention. As shown in FIG. 5, controller 300 is formed of a plurality of low voltage op-amps and may be used to control the regulator output to provide an output voltage that tracks the line voltage and further provide sufficient overhead for operation of the circuitry of the SLIC.

As shown in FIG. 5, op-amps A1 and A2 form an active full-wave rectifier having an output that corresponds to an absolute value of the differential voltage between the incoming signals $V_{A1}$ and $V_{B1}$. These differential voltages correspond to scaled versions of the line voltages. Specifically, in the embodiment of FIG. 5, $V_{A1}$ may correspond to a scaled version of the tip voltage, while the $V_{B1}$ may correspond to a scaled version of the ring voltage. While the scope of the present invention is not limited in this regard, the scaled versions may be 1:100 of the actual line voltages, although other values such as 1:500 may be realized in other embodiments (such as when overvoltage conditions exist). In the circuitry of FIG. 5, $V_{A1}$ is coupled through a resistor R1 to a negative input terminal of op-amp A1, while $V_{B1}$ is coupled through resistor R3 to a node further receiving a reference voltage through resistor R4 to a positive input terminal of op-amp A1. The output of op-amp A1 is coupled through a diode D2 that is coupled to an output node that is further coupled to a diode D4 at an output of op-amp A2. Resistor R2 and diode D1 are coupled in a feedback path between the negative input terminal and output of op-amp A1. In one embodiment resistors R1-R4 may each be 50 kΩ, although the scope of the present invention is not limited in this regard. With respect to op-amp A2, $V_{B1}$ is coupled through a resistor R5 to a negative input terminal of op-amp A2, while $V_{A1}$ is coupled through resistor R7 to a node further receiving a reference voltage through R8 to a positive input terminal of op-amp A2. The output of op-amp A1 is coupled through diode D4 that is coupled to the output node of op-amps A1 and A2. Resistor R6 and diode D3 are coupled in a feedback path between the input and output of op-amp A2. In one embodiment resistors R5-R8 may be 50 kΩ, although the scope of the present invention is not so limited in this regard.

Referring still to FIG. 5, a node between resistors R8 and R9 (which may have values of 12.2 kΩ and 37.8 kΩ, respectively, in one embodiment) is coupled to an active clamp circuit formed of an op-amp A4 having a negative input terminal coupled to this series node. The positive input terminal of op-amp A4 may be coupled to a selected reference voltage (i.e., $V_{REF}$+x or $V_{REF}$+y) via a selection of controllable switches S1 and S2. While the scope of the present invention is not limited in this regard, $V_{REF}$+x may correspond to a given reference voltage plus 0.085 V, while V+y may correspond to the reference voltage plus 0.4 V. Note that a further diode D5 is coupled between the negative input terminal and the output terminal of op-amp A4. Based on the control of switches S1 and S2, op-amp A4 may act as a programmable active clamp circuit to set a maximum regulator output voltage so that the regulator may maintain sufficient control of the regulator voltage under transient events. In one implementation, switch S1 may be closed during normal voice operation which may correspond to approximately −55 volts, while switch S2 may be switched in during ringing operation, at voltages of between approximately −90 V and −120 V.

Referring still to FIG. 5, the absolute value output from op-amps A1 and A2 may be filtered using third op-amp A3. The output of third op-amp A3, SWC, may correspond to a filtered version of the control voltage. This control voltage may be provided to a pulse width modulation (PWM) controller that in turn may output a control signal to the regulator for generation of the output voltage at the desired level. Note that the filter pole for this filter may be reasonably low such that the need for a separate longitudinal bias pole may be avoided. Specifically, the filter circuit shown in FIG. 5 may include op-amp A3 having a negative input terminal coupled to receive the absolute value difference of the line voltages via resistor R9. The positive input terminal of op-amp A3 is coupled to receive a reference voltage $V_{REF}$. A capacitor C1 and resistor R10, and resistors R12 and R13 may be coupled in feedback between the negative input terminal and the output terminal of op-amp A3. In one embodiment, capacitor C1 may be an off-chip capacitor having a value of approximately 1.4 μF, while resistors R10, R12 and R13 may each be 50 kΩ, and resistor R11 may be 1 kΩ. Note that resistors R11, R12 and R13 may further be coupled to speedup circuits (not shown in FIG. 5) to control the gain of op-amp A3 in different states.

Figure 6:
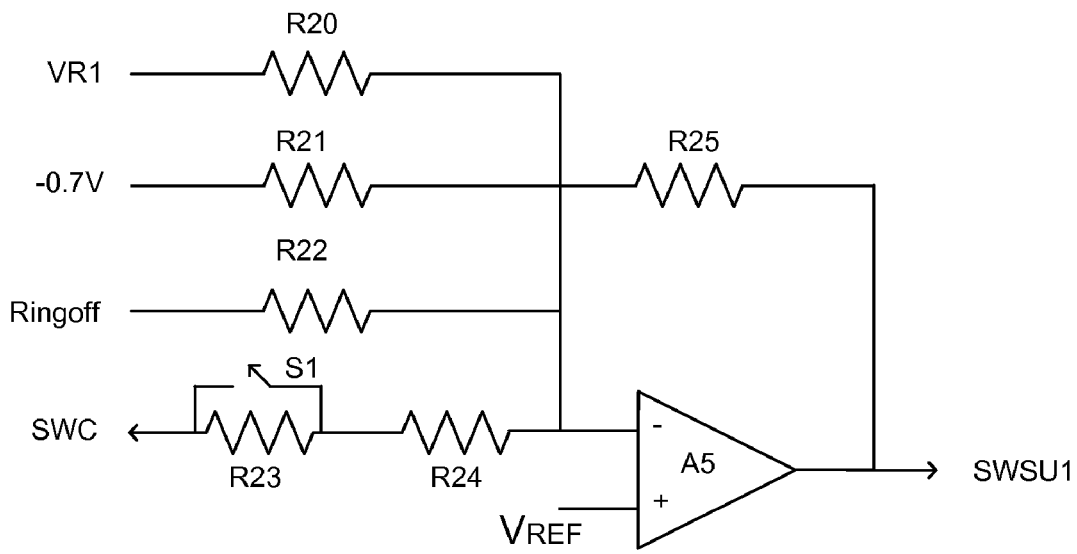
FIG. 6 is a schematic diagram of speedup circuits in accordance with an embodiment of the present invention.
Figure 6:
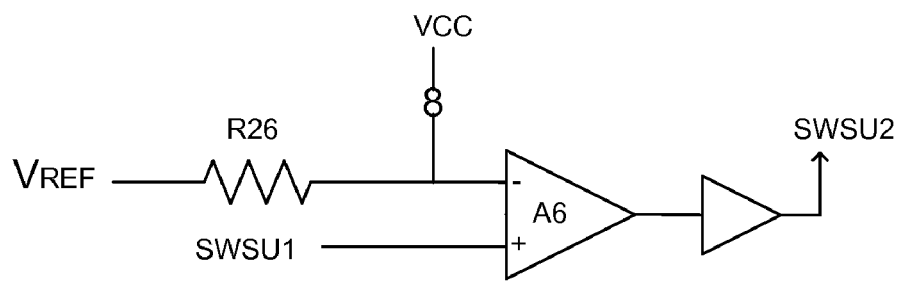

Referring now to FIG. 6, shown are schematic diagrams of speedup circuits in accordance with an embodiment of the present invention. As shown in FIG. 6, a first speedup circuit 310 and a second speedup circuit 320 are present. Speedup circuit 310 includes an op-amp A5 having a positive input terminal coupled to receive a reference voltage $V_{REF}$ and a negative input terminal coupled to receive a combined output of a number of source lines. Specifically, an input node $N_i$ combines the switching control signal, SWC, a ring tracking control signal, Ringoff, a DC overhead (e.g., −0.7 V in the embodiment of FIG. 6) and a scaled version of the voltage regulator output, $V_{R1}$. These various sources are coupled through resistors R20-R24, respectively to the negative input terminal of op-amp A5. An additional resistor, R25, is present in the feedback path between the negative input terminal and the output terminal of op-amp A5. First speedup circuit 310 may be used to speedup the response of circuit 300 during ringing. That is, the gain of op-amp A3 may be adjusted in ringing versus active states due to a minimum ringing offset requirement.

Second speedup circuit 320 may receive at its positive input terminal the output of first speedup circuit 310. In turn, op-amp A6 has a negative input terminal coupled to receive a reference voltage $V_{REF}$, through a resistor R26, along with an offset current, e.g., generated by a current source. Second speedup circuit 320 may provide an additional speedup when the output of first speedup circuit 310 differs from $V_{REF}$ by more than a predetermined amount. In such instances, a transient may be assumed, and the output of second speedup circuit 320 may be used to further speedup the response of op-amp A3. In this way, the filter time constant may be effectively reduced during ringing by activating one or both of the speedup circuits. Accordingly, all other feedback loops may remain active and thus a low voltage ring trip and off-hook detection scheme may be implemented.

Figure 7:
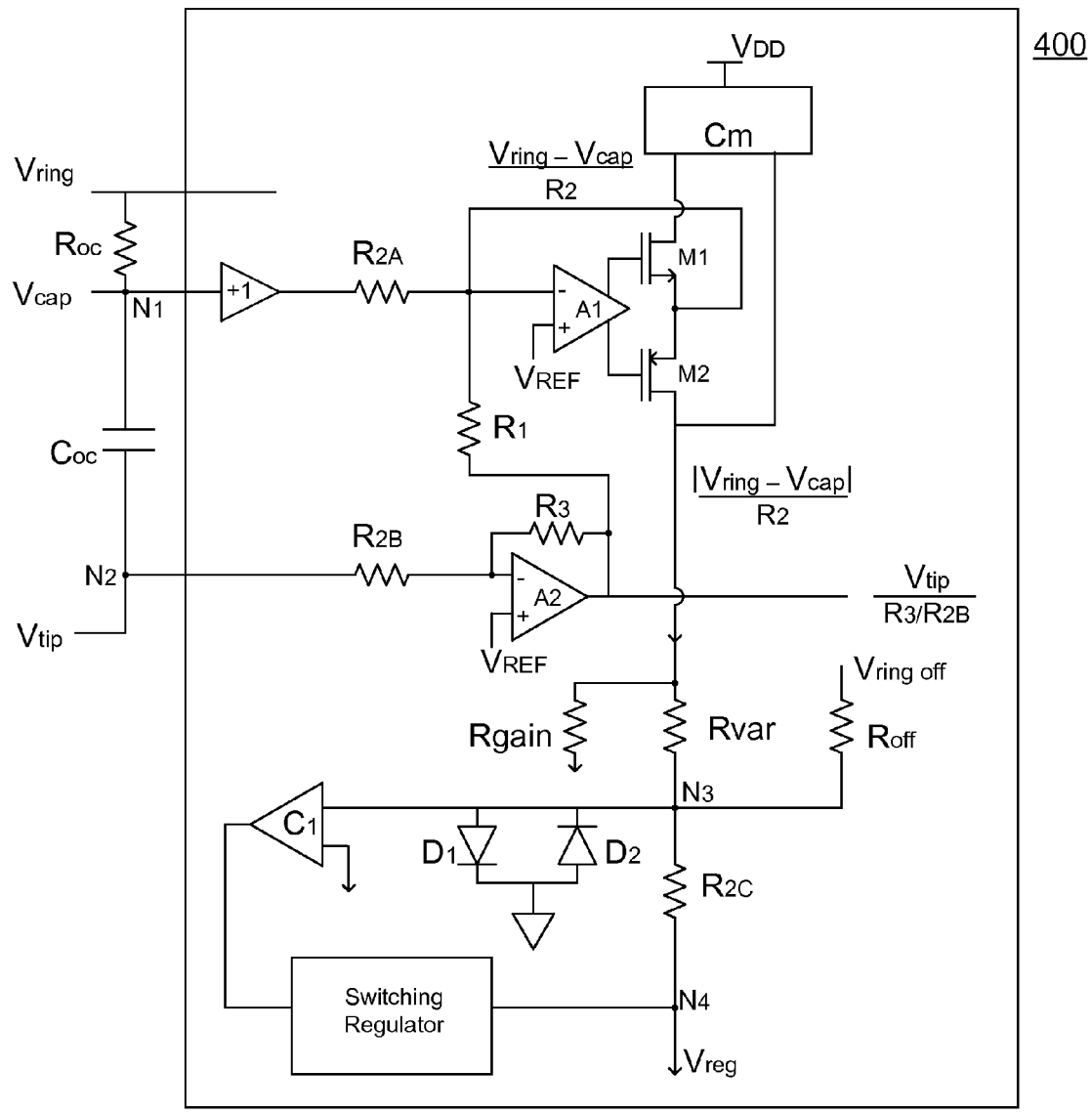
FIG. 7 is a schematic diagram of a regulator/controller in accordance with another embodiment of the present invention.

Control circuitry for tracking regulators such as that shown in FIGS. 5 and 6 may be suitable in many embodiments as it provides for use of only low voltage op-amps and associated circuitry, however these op-amps can still consume a large amount of chip area. Accordingly, some implementations may take advantage of a design that seeks to minimize the number of op-amps needed to perform control of voltage regulation in accordance with an embodiment of the present invention. Referring now to FIG. 7, shown is a schematic diagram of a regulator/controller in accordance with another embodiment of the present invention. As shown in FIG. 7, controller 400 may be coupled to line voltages $V_{tip}$ and $V_{ring}$. More specifically, a value corresponding to the ring voltage may be provided through an off-chip resistor, $R_{OC}$, and though a source following buffer +1 through a resistor R2A to a negative input terminal of a first op-amp A1. In turn, a reference voltage may be provided to the positive input terminal of op-amp A1. Note that an off-chip capacitor, $C_{OC}$, is coupled between a node $N_1$ (which is at a voltage of $V_{cap}$) and a second node $N_2$ that in turn is coupled to the tip voltage, $V_{tip}$. Accordingly, this input voltage into op-amp A1 may correspond to a value of $(V_{ring}-V_{cap})/R2$. The negative input terminal of op-amp A1 is further coupled to a resistor R1 that in turn is coupled to a second op-amp A2 via a feedback resistor R3. The negative input terminal of op-amp A2 is further coupled to node $N_2$ via resistor R2B, while a positive input terminal of op-amp A2 is coupled to a reference voltage. Accordingly, the output of op-amp A2 may be equal to a voltage of $V_{tip}/R3/R2$. Op-amp A2 may thus generate a scaled (low voltage) signal proportional to $-V_{tip}$. The output of op-amp A2 can be summed with the signal at node $N_3$ such that the output of op-amp A2 plus the output of MOSFETs M1 and M2 is proportional to the difference between nodes $N_1$ and $N_2$ at the input of circuit 400, which is the filtered line voltage used to set the regulated voltage. Note that the output of op-amp A2 may be used in other portions of a SLIC including a DC feed loop, longitudinal loop, fault detectors, line test circuits and so forth.

Referring still to FIG. 7, note that the output of op-amp A1 is differentially coupled to a pair of MOSFETs M1 and M2 (which may be a nMOSFET and a pMOSFET, respectively), and more specifically to the gate terminals of MOSFETs M1 and M2. The source terminals of MOSFETs M1 and M2 are fed back to the negative input terminal of op-amp A1. The drain terminal of MOSFET M1 is coupled to a current mirror CM coupled to a supply voltage $V_{DD}$. In turn, the output of current mirror CM is coupled to the drain terminal of MOSFET M2 such that this node provides a control current (i.e., a filtered control current) representative of the absolute value difference between the ring voltage and the capacitor voltage, $V_{cap}$, i.e., $|(V_{ring}-V_{cap})|/R2$. Note that the off-chip components $R_{OC}$ and $C_{OC}$ may inherently act to speed up performance of op-amp A1 such that the need for separate speedup circuitry can be avoided. That is, these components may provide filtering of the line voltages such that the need for speeding up operation during transients can be bypassed.

To provide enhanced performance including allowing for limiting of the switching regulator voltage providing, protection circuitry and so forth, a controllable resistance, $R_{var}$, may be coupled between the drain terminal of MOSFET M2 and a node $N_3$. Still, a gain circuit including a resistor $R_{gain}$ may be coupled to $R_{VAR}$. Furthermore, an offset voltage, $V_{ringoff}$, may be coupled through an offset resistor $R_{off}$ to node $N_3$. In turn, node $N_3$ may be coupled to an input terminal of a comparator C1. Note that a protection circuit including a pair of oppositely-coupled diodes D1 and D2 may be coupled between this input terminal and a ground voltage. Comparator C1 thus outputs a control signal that is provided to a switching regulator that generates the regulated voltage, $V_{REG}$. The output of C1 thus is used as an input to a switching regulator controller to adjust the switching waveform to set the regulator to the desired output voltage. The output of the switching regulator may be coupled to provide the regulated voltage, $V_{REG}$, at an output node, $N_4$, to which another resistor, R2C, may be coupled.

In the embodiment shown in FIG. 7, circuit 400 may include some amount of high voltage circuit, although most of the circuitry can be formed using low voltage circuitry, although the scope of the present invention is not so limited in this regard. By using an embodiment such as that shown in FIG. 7, the need for one or more speedup circuits may be avoided. Furthermore, the number of op-amps used to provide control of voltage regulation may be reduced.

Figure 8:
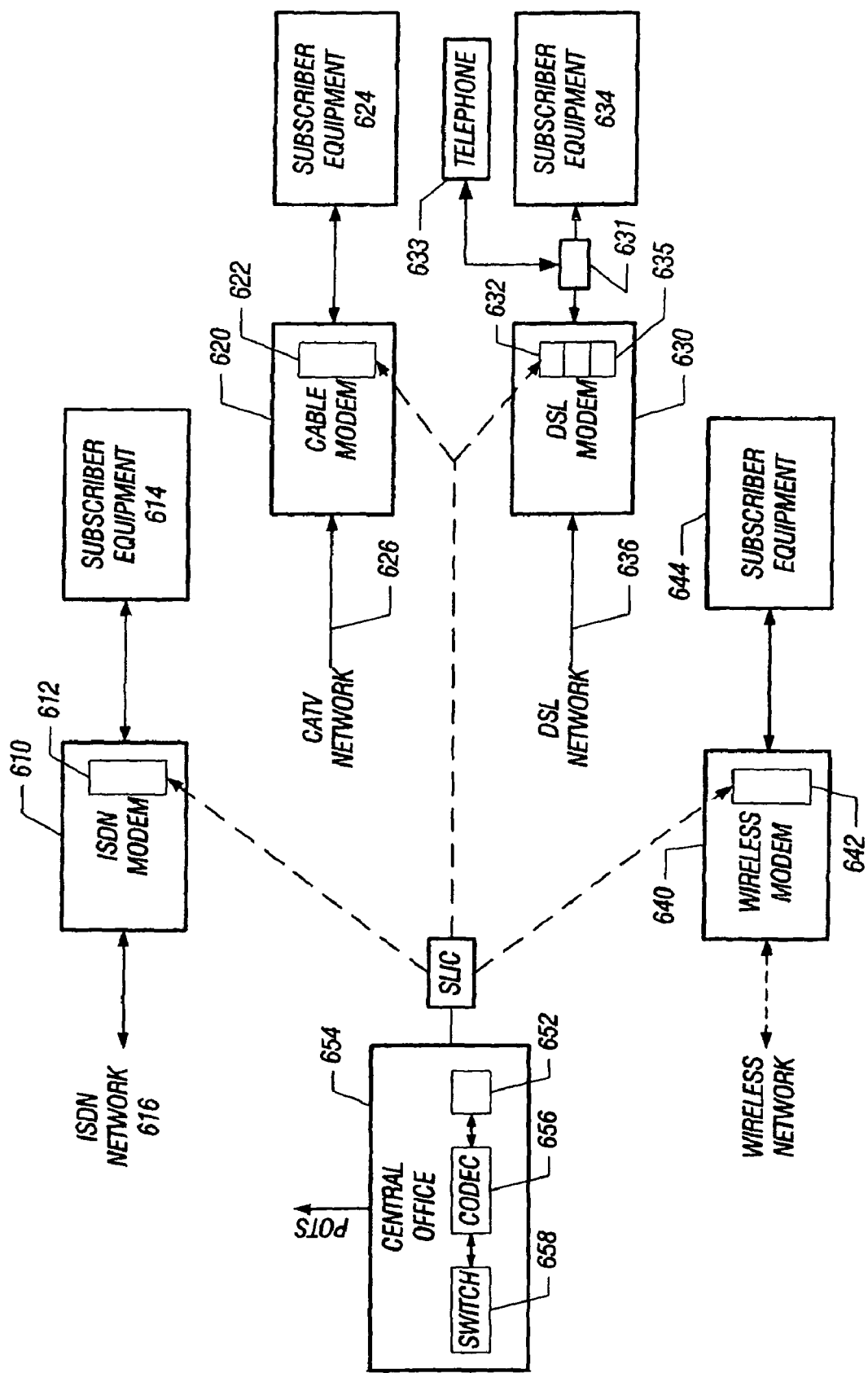
FIG. 8 is a block diagram which shows illustrations of various long and short loop applications for a SLIC in accordance with one embodiment of the present invention.

In some applications a SLIC in accordance with an embodiment of the present invention may be used in a central telephone exchange that communicates with subscriber equipment using the POTS ("plain old telephone system") interface. Such an implementation is shown in FIG. 8, which shows illustrations of various long and short loop applications for a SLIC. As shown in FIG. 8, one application of a SLIC is in connection with a central office. Specifically, central office 654 includes a SLIC 652 which is coupled to a POTS interface. In turn, SLIC 652 is coupled to a CODEC 656 and a switch 658. Of course, other implementations are possible. Other SLIC applications include private exchanges and short loop applications. Short loop applications often have a relatively short distance subscriber loop between the subscriber equipment and the SLIC. This is often the case when subscriber equipment interfaces with a non-POTS system such as a network that uses different communication media or protocols.

As shown in FIG. 8, in one embodiment, a SLIC 612 is used in an Integrated Services Digital Network (ISDN) modem 610. ISDN modem 610 provides bidirectional communication between subscriber equipment 614 and the ISDN network 616. In another embodiment, SLIC 622 is used in cable modem 620. In one embodiment, cable modem 620 communicates information using the community antenna television (CATV) network 616. SLIC 622 may enable cable modem 620 to communicate information from the coaxial CATV cable 626 to subscriber equipment 624. In another example, digital subscriber line (DSL) modem 630 incorporates a SLIC 632 and a DSL interface 635 for communication with digital subscriber line 636. In turn, DSL modem 630 is coupled to a splitter 631, which in turn is coupled to subscriber equipment 634, e.g., a computer system for communication of digital data at high speeds. Furthermore, splitter 631 couples to a telephone 633 for communication of voice data. Another example includes wireless applications such as wireless modem 640 including a SLIC 642 that in turn is coupled between a wireless network and subscriber equipment 644. Of course, other applications are possible. Unlike the central exchange applications, the short loop applications may enable the design of SLICs having relaxed performance characteristics. In particular, a short loop application SLIC need not necessarily meet typical POTS standards if the subscriber equipment is not actually connected to the public telephone network.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first resistance coupled between a first lead of a subscriber loop and a first node, and a first capacitance coupled between the first node and a second node, the second node coupled to a second lead of the subscriber loop; and a circuit to convert a voltage across the first capacitance into a proportional absolute value signal used to provide a control signal to a switching regulator for a subscriber line interface circuit (SLIC) coupled to the subscriber loop, wherein the circuit comprises:

a first operational amplifier having a first input terminal coupled to the first node and a second input terminal coupled to receive a reference voltage;

a pair of metal oxide semiconductor field effect transistors (MOSFETs) having gate terminals coupled to an output of the first operational amplifier, the MOSFET pair having first terminals coupled to provide a feedback signal to the first input terminal of the first operational amplifier; and a current minor having an input node coupled to a second terminal of the first MOSFET and an output node coupled to a second terminal of the second MOSFET, wherein the second terminal of the second MOSFET is to provide the control signal to the switching regulator.

2. The apparatus of claim 1, wherein the first resistance and the first capacitance comprise off-chip components and the SLIC comprises the first operational amplifier, the pair of MOSFETs, and the current mirror.

3. The apparatus of claim 2, wherein the off-chip components are to accelerate an output of the first operational amplifier when the subscriber loop is in a ringing mode.

4. The apparatus of claim 1, wherein the output of the current minor is representative of an absolute value of a voltage difference between the first lead and the first node.

5. The apparatus of claim 1, further comprising a voltage clamp coupled to the second terminal of the second MOSFET to limit the control signal to a predetermined level.

6. The apparatus of claim 5, further comprising a gain change circuit coupled to the second terminal of the second MOSFET to adjust the control signal during a ringing mode of the subscriber loop.

7. The apparatus of claim 6, further comprising an offset signal coupled to an output of the voltage clamp to provide a ringing offset value during the ringing mode.

8. The apparatus of claim 1, further comprising a buffer coupled to the first node and a second resistance coupled between an output of the buffer and the first input terminal of the first operational amplifier.

9. The apparatus of claim 1, further comprising a second operational amplifier having a first input terminal coupled to the second node and a second input terminal coupled to receive the reference voltage, the second operational amplifier having an output coupled to the first input terminal of the first operational amplifier.

10. The apparatus of claim 5, further comprising a comparator having a first input terminal coupled to the output of the voltage clamp, the comparator having an output coupled to control the switching regulator.

11. A system comprising:

a low voltage subscriber line interface circuit (SLIC), including:

a first operational amplifier having a first input terminal coupled to an intermediate node between tip and ring voltages of a subscriber loop and a second input terminal coupled to receive a reference voltage;

a pair of metal oxide semiconductor field effect transistors (MOSFETs) having gate terminals coupled to an output of the first operational amplifier, the MOSFET pair having first terminals coupled to provide a feedback signal to the first input terminal of the first operational amplifier; and a current minor having an input node coupled to a second terminal of the first MOSFET and an output node coupled to a second terminal of the second MOSFET, wherein the second terminal of the second MOSFET is to provide a filtered control current; and a high voltage SLIC coupled to the low voltage SLIC via a three-wire interface, the high voltage SLIC further coupled to provide the tip voltage and the ring voltage to the subscriber loop, wherein the high voltage SLIC comprises a switching regulator to generate a regulated voltage under control of the low voltage SLIC.

12. The system of claim 11, further comprising a first resistance coupled between the ring voltage and the intermediate node and a first capacitance coupled between the intermediate node and the tip voltage, the first resistance and the first capacitance to filter AC signals on the subscriber loop.

13. The system of claim 11, further comprising a digital signal processor (DSP) including the low voltage SLIC.

14. The system of claim 11, wherein the low voltage SLIC and the high voltage SLIC are formed on a single substrate of an integrated circuit.

15. The system of claim 12, further comprising a comparator having a first input terminal coupled to a control node having a voltage representative of the filtered control current and a second input terminal coupled to the reference voltage, wherein an output of the comparator is coupled to control the switching regulator.

* * * * *

UNITED STATES PATENT AND TRADEMARK OFFICE
CERTIFICATE OF CORRECTION

| | | |
|---|---|---|
| PATENT NO. | : 8,249,247 B2 | Page 1 of 1 |
| APPLICATION NO. | : 11/645878 | |
| DATED | : August 21, 2012 | |
| INVENTOR(S) | : Russell J. Apfel | |

It is certified that error appears in the above-identified patent and that said Letters Patent is hereby corrected as shown below:

Column 11:
Line 17, "minor" should be --mirror--

Column 11:
Line 31, "minor" should be --mirror--

Column 12:
Line 21, "minor" should be --mirror--

Signed and Sealed this
Twentieth Day of November, 2012

David J. Kappos
*Director of the United States Patent and Trademark Office*